United States Patent
Yoo et al.

[19]

[11] Patent Number: 6,009,066
[45] Date of Patent: Dec. 28, 1999

[54] OPTICAL PICKUP OF TWO DIFFERENT WAVELENGTH LASER SOURCES WITH AN OBJECTIVE LENS HAVING AN ANNULAR SHIELDING REGION

[75] Inventors: Jang-Hoon Yoo; Chul-Woo Lee, both of Seoul, Rep. of Korea

[73] Assignee: Samsung Electronics Co., Ltd., Suwon, Rep. of Korea

[21] Appl. No.: 09/196,355

[22] Filed: Nov. 19, 1998

[30] Foreign Application Priority Data

Nov. 19, 1997 [KR] Rep. of Korea ..................... 97-61074

[51] Int. Cl.⁶ .................................................. G11B 7/00
[52] U.S. Cl. .................. 369/112; 369/44.23; 369/44.37; 369/94; 369/118
[58] Field of Search ..................................... 369/112, 118, 369/44.23, 58, 94, 114, 13, 44.37; 359/738

[56] References Cited

U.S. PATENT DOCUMENTS

| | | | |
|---|---|---|---|
| 5,734,637 | 3/1998 | Ootaki et al. | 369/112 |
| 5,737,294 | 4/1998 | Yamakawa et al. | 369/99 |
| 5,777,970 | 7/1998 | Kajiyama et al. | 369/94 |
| 5,793,734 | 8/1998 | Tsuchiya et al. | 369/112 |
| 5,822,135 | 10/1998 | Lee et al. | 359/738 |
| 5,835,473 | 11/1998 | Shimozono et al. | 369/112 |
| 5,841,754 | 11/1998 | Lee et al. | 369/109 |
| 5,844,879 | 12/1998 | Morita et al. | 369/118 |
| 5,883,874 | 3/1999 | Choi | 369/112 |

FOREIGN PATENT DOCUMENTS

| | | |
|---|---|---|
| 0 776 003 | 5/1997 | European Pat. Off. . |
| 0 780 838 | 6/1997 | European Pat. Off. . |
| 0 790 607 | 8/1997 | European Pat. Off. . |
| 0 803 867 | 10/1997 | European Pat. Off. . |
| 0 831 471 | 3/1998 | European Pat. Off. . |
| 0 859 356 | 8/1998 | European Pat. Off. . |
| WO 97/35306 | 9/1997 | WIPO . |

*Primary Examiner*—Tan Dinh
*Assistant Examiner*—Kim-Kwok Chu
*Attorney, Agent, or Firm*—Staas & Halsey LLP

[57] ABSTRACT

An optical pickup compatible with at least two types of optical recording media using light beams having respectively different wavelengths for recording and reproducing information. In the optical pickup, a first laser light source emits a light beam having a relatively shorter wavelength. A first photodetector detects a reflected light beam with respect to the relatively shorter wavelength. An objective lens forms an annular shielding region between a near axis region of a relatively smaller radius and a far axis region of a relatively larger radius. A laser unit emits a light beam having a relatively longer wavelength, and detects only a light beam passing though the near axis region in the objective lens among reflected light beams having the relatively longer wavelength. A plurality of beam splitters directs the light beams emitted from the first laser light source and the laser unit to the objective lens, and directs the light beam reflected from each of the optical recording media to a corresponding one of the first photodetector and the laser unit. The optical pickup of the present invention has compatibility with respect to disks regardless of the thicknesses and various aspects of the disks, and can detect a good signal. Also, the optical pickup is manufactured and mass-produced at a low cost.

19 Claims, 4 Drawing Sheets

OPTICAL PICKUP OF TWO DIFFERENT WAVELENGTH LASER SOURCES WITH AN OBJECTIVE LENS HAVING AN ANNULAR SHIELDING REGION

CROSS-REFERENCE TO RELATED APPLICATIONS

This application claims the benefit of Korean Application No. 97-61074, filed Nov. 19, 1997, in the Korean Patent Office, the disclosure of which is incorporated herein by reference.

BACKGROUND OF THE INVENTION

1. Field of the Invention

The present invention relates to an optical pickup for a digital versatile disk (DVD) which is compatible with a class of compact disks, and more particularly, to an optical pickup capable of recording and reproducing a signal with respect to a digital versatile disk (DVD) and a class of compact disks, by moving a position of a laser unit which emits a light beam having a relatively longer wavelength than that used in conjunction with the DVD and detects the light beam having the relatively long wavelength reflected from a compact disk, and limiting a size of a photodetector of the laser unit which detects the reflected light beam.

2. Description of the Related Art

So far, a high-density optical disk system enlarges a numerical aperture of an objective lens in order to increase a recording density, and uses a short wavelength light source of 635 nm or 650 nm. The system has been developed to also reproduce information from a compact disk (CD) having a thickness different from that of a digital versatile disk (DVD) as well as recording information to and reproducing information from a DVD, by using a short wavelength light source. However, to be compatible with a compact disk-recordable (CD-R), which is a recent type of a CD, laser light having a wavelength of 780 nm should be used. This is due to the recording characteristic of the CD-R as a recording medium. As a result, using light beam wavelengths of 780 nm and 635 nm in a single optical pickup becomes very important for compatibility of the DVD and the CD-R. A conventional optical pickup which is compatible with the DVD and the CD-R will be described below with reference to FIG. 1.

FIG. 1 shows an optical pickup using two laser light sources and a single objective lens. The optical pickup shown in FIG. 1 uses laser light having a wavelength of 635 nm when reproducing information from a DVD, and uses laser light having a wavelength of 780 nm when recording information from and reproducing information to a CD-R.

A light beam having a wavelength of 635 nm emitted from a laser light source 11 is incident to a collimating lens 12. The light beam is depicted as a solid line. The collimating lens 12 collimates the incident light beam emitted from the laser light source 11 into a parallel light beam. The parallel light beam passing through the collimating lens 12 is reflected by a beam splitter 13, and then goes to an interference filter prism 14.

Meanwhile, a light beam having a wavelength of 780 nm emitted from a laser light source 21 passes through a collimating lens 22, a beam splitter 23 and a converging lens 24 in sequence, and then proceeds to the interference filter prism 14, which is depicted as a dotted line.

The interference filter prism 14 totally transmits the light beam having the wavelength of 635 nm reflected by the beam splitter 13, and totally reflects the light beam of the 780 nm wavelength converged by the converging lens 24. As a result, the light beam emitted from the laser light source 11 is incident to a wave plate 15 in the form of a parallel beam. The light beam emitted from the laser light source 21 is incident to the wave plate 15 in the form of a divergent beam. The light beams transmitted via the wave plate 15 pass through a variable aperture 16, and are then incident to the objective lens 17.

The objective lens 17 is designed to focus a light beam of the 635 nm wavelength emitted from the laser light source 11 on an information recording surface of a DVD 18 having a thickness of 0.6 mm.

Therefore, the light beam reflected from the information recording surface of the DVD 18 contains information recorded on the information recording surface thereof. The reflected light beam is transmitted through the objective lens 17, the variable aperture 16, the wave plate 15, the interference filter prism 14, and the beam splitter 13, and then is incident to a photodetector 19 for detecting optical information.

Also, the objective lens 17 focuses a divergent light beam having the wavelength of 780 nm emitted from the laser light source 21 on an information recording surface of a CD-R 25 having a thickness of 1.2 μm. An optical system having such a structure which can converge a divergent light beam using the objective lens 17, is called a "finite optical system".

Spherical aberration is generated due to a difference in the thicknesses between the DVD 18 and the CD-R 25. In more detail, the spherical aberration is due to the fact that the distance between the information recording surface of the CD-R 25 and the objective lens 17 is farther than that between the information recording surface of the DVD 18 and the objective lens 17, along an optical axis.

By using the variable aperture 16 to be described later with reference to FIG. 2, the light beam of the 780 nm wavelength forms an optimized beam spot on the information recording surface of the CD-R 25. The light beam of the 780 nm wavelength reflected from the CD-R 25 is transmitted through the objective lens 17, variable aperture 16, the wave plate 15, reflected by the interference filter prism 14, transmitted through the converging lens 24 reflected by the beam splitter 23, and then is detected in the photodetector 26.

The variable aperture 16 of FIG. 1 has a thin-film type structure as shown in FIG. 2 which can selectively transmit the light beams incident to the region whose numerical aperture (NA) is less than or equal to 0.6 which coincides with the diameter of the objective lens 17. That is, the variable aperture 16 is partitioned into two regions. A first region is a region which totally transmits the light beams of the 635 nm wavelength and the 780 nm wavelength and whose numerical aperture (NA) is less than or equal to 0.45. A second region surrounding the first region is a region which includes a dielectric thin film, totally transmits the light beam of the 635 nm wavelength and totally reflects the light beam of the 780 nm wavelength, and whose numerical aperture (NA) is greater than 0.45. Also, the first region comprises a quartz ($SiO_2$) thin film in order to remove any optical aberration generated by the dielectric thin film coated second region.

The 780 nm wavelength light passing through the first region having the 0.45 NA or below in the variable aperture 16 forms a beam spot appropriate to the CD-R 25 on the information recording surface thereof. Thus, the optical pickup of FIG. 1 forms an optimized optical spot and is compatible with the DVD 18 and the CD-R 25 when an optical recording medium is changed from the DVD 18 and the CD-R 25.

The optical pickup of FIG. 1 as described above should form a "finite optical system" with respect to the light beam of the 780 nm wavelength in order to remove spherical aberration generated when compatibly changing a DVD and a CD-R. However, such a fabricating process of the optical system does not only become complicated but also assembly of the various optical components is difficult. Also, an optical path difference between the first region having the 0.45 NA or below and the second region having the 0.45 NA or above, is generated due to the dielectric thin film formed at the second region having the 0.45 NA or above in the variable aperture 16. Therefore, the first region should include a special optical thin film, i.e., a quartz ($SiO_2$) thin film, to remove this difference. For this reason, the first region includes the quartz ($SiO_2$) thin film and the second region includes the dielectric thin film. However, a manufacturing process is complicated and adjustment of the thicknesses of the quartz ($SiO_2$) thin film and the dielectric thin film should be performed precisely in units of "$\mu m$." Thus, it has been difficult in mass-producing the above-described optical pickup.

In order to solve the above problems, in the case of forming an optical pickup (not shown) including a laser unit in which the laser light source 21 for emitting the light beam of the 780 nm wavelength and the photodetector 26 are incorporated in a single module, without using the variable aperture 16 and the converging lens 24, spherical aberration is not generated with respect to the CD-R 25. And, the optical pickup forms a finite optical system maintaining the 0.55 NA or above in a numerical aperture of the objective lens, and thus a beam spot having a size of 1.2–1.3 $\mu m$ is formed on the information recording surface of the CD-R 25. However, a most appropriate size of the beam spot when reproducing information from general types of compact disks is 1.4~1.6 $\mu m$. To increase the size of a beam spot converged into the CD-R, the laser unit is moved at a position where no spherical aberration is generated so that a total conjugate length (TCL) is lengthened. The TCL is a distance corresponding to an optical path from an information recording surface of a disk to a laser light source. A beam spot having the size of 1.4 $\mu m$ is formed on the information recording surface of the CD-R according to movement of the laser unit, but spherical aberration is generated and a side lobe is increased. The light beam generating such a side lobe is a light beam passing through a far region of the objective lens having a relatively larger radius than that of a near axis region of the objective lens, and has a negative effect on a reproduction signal.

SUMMARY OF THE INVENTION

In order to solve the problems, it is an object of the present invention to provide an optical pickup compatible with a compact type disk and a DVD, with no separate variable aperture, by moving a laser unit in a direction that a total conjugate length (TCL) is lengthened at a position where no spherical aberration is generated, and lessening the size of a photodetector so that a light beam passing through a far axis region having a relatively larger radius in an objective lens is not detected, in order to adjust for the thicknesses of different types of disks and variation of wavelengths.

Additional objects and advantages of the invention will be set forth in part in the description which follows and, in part, will be obvious from the description, or may be learned by practice of the invention.

To accomplish the above and other objects of the present invention, there is provided an optical pickup compatible with at least two types of optical recording media using light beams having respectively different wavelengths for recording and reproducing information, the optical pickup including a first laser light source to emit a light beam having a relatively shorter wavelength; a first photodetector to detect a reflected light beam with respect to the relatively shorter wavelength; an objective lens to form an annular shielding region between a near axis region of a relatively smaller radius and a far axis region of a relatively larger radius; a laser unit to emit a light beam having a relatively longer wavelength, and to detect only a portion of the light beam passing though the near axis region in the objective lens among reflected light beams having the relatively longer wavelength; and a plurality of beam splitters to direct the light beams emitted from the first laser light source and the laser unit to the objective lens, and to direct the light beam reflected from each of the optical recording media to a corresponding one of the first photodetector and the laser unit.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Reference will now made in detail to the present preferred embodiments of the present invention, examples of which are illustrated in the accompanying drawings. The embodiments are described below in order to explain the present invention by referring to the figures.

Figure 1:
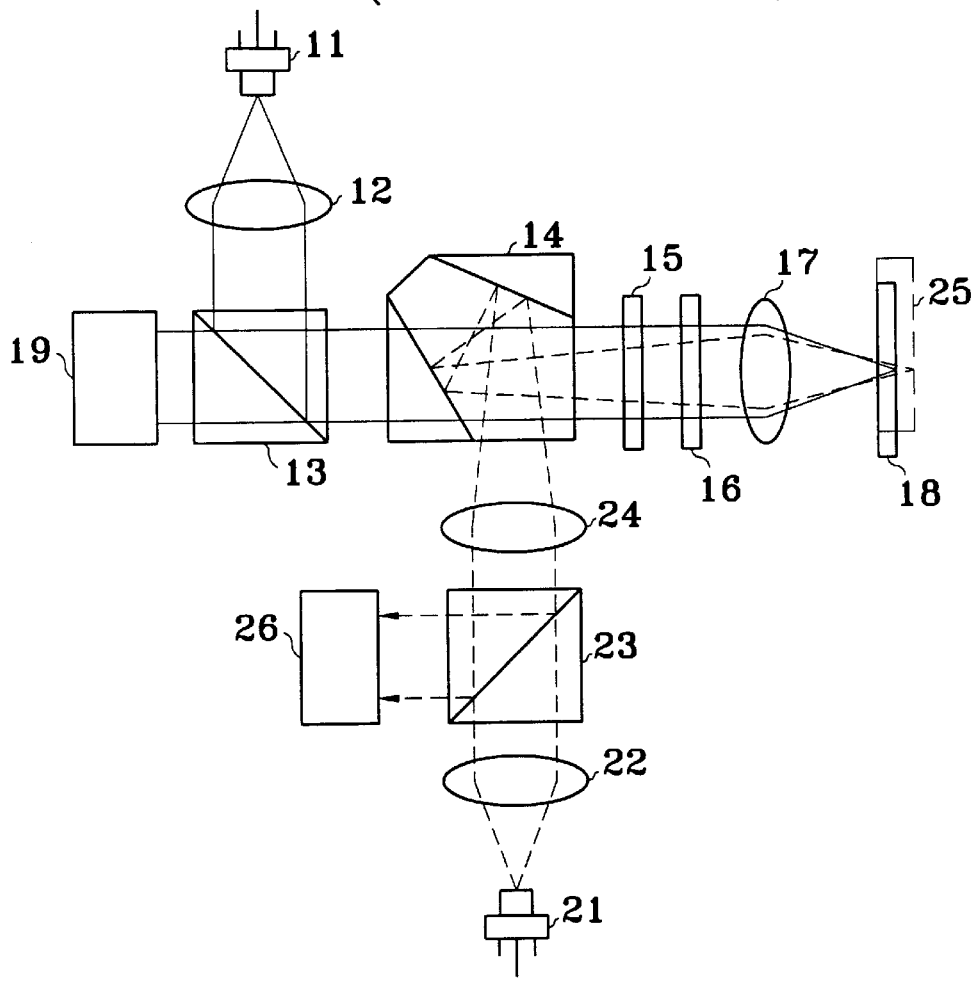
FIG. 1 is a view showing a structure of a conventional optical pickup.
Figure 2:
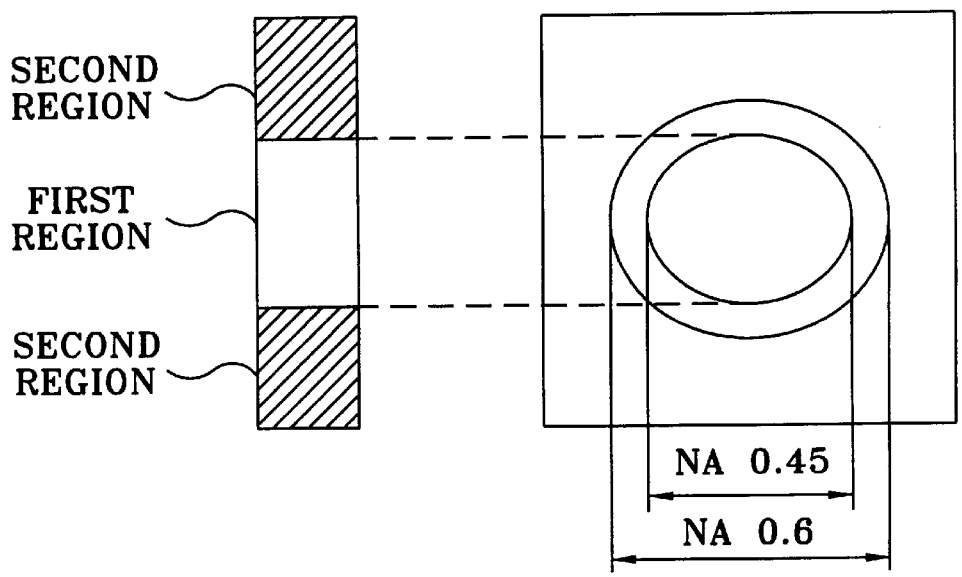
FIG. 2 is a view showing a structure of a variable aperture shown in FIG. 1.
Figure 3:
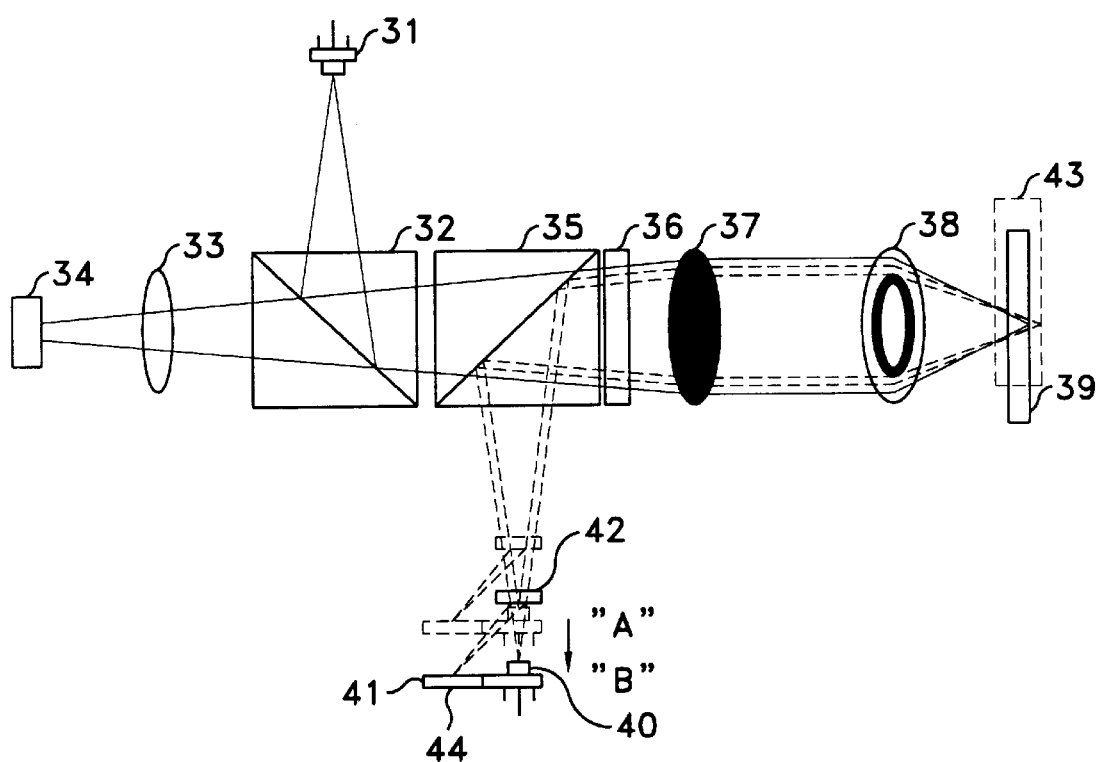
FIG. 3 is a view showing a construction of an optical pickup according to an embodiment of the present invention.

FIG. 3 shows an optical pickup according to an embodiment of the present invention. The optical pickup shown in FIG. 3 includes two laser light sources 31 and 40 for emitting light beams having different wavelengths. A polarizing beam splitter 32 which is next to the laser light source 31, totally reflects a light beam incident from the laser light source 31, and totally transmits a light beam reflected from a disk 39. An optical detection lens 33 and a photodetector 34 for detecting the light beam reflected from the disk 39 are positioned adjacent to (to the left in FIG. 3) the polarizing beam splitter 32. A beam splitter 35 for selectively total-transmitting or total-reflecting light beams to be incident according to wavelengths of light beams, is disposed adjacent to (to the right in FIG. 3) the polarizing beam splitter 32. A phase plate 36 for transmitting an incident light beam and a collimating lens 37 for collimating an incident light beam into parallel light, are positioned adjacent to (to the right in FIG. 3) the beam splitter 35. An annular shielding objective lens 38 for focusing light beams to be incident on information recording surfaces of the disk 39 and disk 43, is disposed next to the collimating lens 37.

Meanwhile, a holographic beam splitter 42 for altering an optical path of the light beam reflected from the information recording surface of the disk 43 so as to direct the light beam toward a photodetector 41, is disposed between the laser light source 40 and the beam splitter 35. The photodetector 41 for detecting the light beam reflected from the disk 43 and the laser light source 40 are incorporated in a single module as a laser unit 44. The photodetector 41 is manufactured to have a small size in a radial direction of a disk so that only a portion of the light beam passing through a near axis region having a relatively smaller radius in the annular shielding objective lens 38. The holographic beam splitter 42 and the laser unit 44 maintain a constant interval therebetween.

An operation of the optical pickup as constructed above will be described in more detail below. Here, the disk 39 is a DVD and the disk 43 is a compact type disk, and are used as optical recording media.

First, in the case of the DVD 39 having a relatively thin thickness, a light beam having a wavelength of 635 nm emitted from the laser light source 31 is incident to the polarizing beam splitter 32, which is depicted as a solid line. The incident light beam is transmitted via the beam splitter 35 and the phase plate 36 and then proceeds to the collimating lens 37. The light beam proceeding to the collimating lens 37 is collimated into parallel light, and the collimated parallel light beam is directed to the annular shielding objective lens 38. The annular shielding objective lens 38 focuses the incident light beam on the information recording surface of the DVD 39 and forms an optimized beam spot, using a maximum numerical aperture. The light beam reflected from the information recording surface of the DVD 39 contains information recorded thereon. The reflected light beam is transmitted via the annular shielding objective lens 38, the collimating lens 37, the phase plate 36, the beam splitter 35 and the polarizing beam splitter 32, and then proceeds to the optical detection lens 33. The light beam directed to the optical detection lens 33 is incident to the photodetector 34 for detecting optical information, and the optical information with respect to the DVD 39 is detected by the photodetector 34.

Meanwhile, in the case of a compact type disk having a relatively thick thickness, the light beam of a wavelength of 780 nm emitted from the laser light source 40 is incident to the holographic beam splitter 42, which is depicted as a dotted line. The incident light beam proceeds to the beam splitter 35 and is totally reflected. The totally reflected light beam is transmitted via the phase plate 36 and then proceeds to the collimating lens 37. The light beam incident to the collimating lens 37 is collimated into parallel light, and the collimated parallel light is directed to the annular shielding objective lens 38. The annular shielding objective lens 38 forms an optimized beam spot on the information recording surface of the compact type disk 43.

When the laser unit 44 is disposed at a position where spherical aberration is not generated, that is, when the laser unit 44 is disposed a position "A", the optical pickup uses a finite optical system maintaining a numerical aperture of 0.55 or above in the annular shielding objective lens 38. The optical pickup of the present invention moves the laser unit 44 from the position "A" to a position "B" in order to increase the size of a beam spot focused on the compact type disk 43, and thereby makes an optical path ranging from the information recording surfaces of disks to laser light sources longer than that when no spherical aberration is generated. According to the position movement of the laser unit 44, a beam spot having the size of 1.4 μm is formed on the compact type disk 43. However, a side lobe is increased due to spherical aberration generated on the compact type disk 43 as described above. The optical pickup of the present invention uses the annular shielding objective lens 38 to shield a light beam passing through a far axis region having a relatively larger radius in the annular shielding objective lens 38. The annular shielding objective lens 38 forms an annular shielding region having a thin band form between the near axis region and the far axis region. Also, the photodetector 41 which detects the light beam reflected from the information recording surface of the compact type disk 43 is size-diminished in a radial direction of the compact type disk 43, and detects only the portion of the light beam which passes through the near axis region with respect to the annular shielding objective lens 38. As a result, an effective numerical aperture of the objective lens is maintained to 0.5 or below from 0.55 or above.

Thus, the light beam reflected from the information recording surface of the compact type disk 43 is totally reflected by the beam splitter 35, and then the totally reflected light beam is incident through the holographic beam splitter 42 and to the photodetector 41 of the laser unit 44. The photodetector 41 detects only the portion of the light beam passed through the near axis region with respect to the annular shielding objective lens 38. Accordingly, the optical pickup according to the embodiment of the present invention can perform recording and reproduction of information with respect to the DVD and the compact type disk.

The distance between the laser unit 44 and the holographic beam splitter 42 remains constant as the holographic beam splitter 42 moves in conjunction with the laser unit 44.

Figure 4:
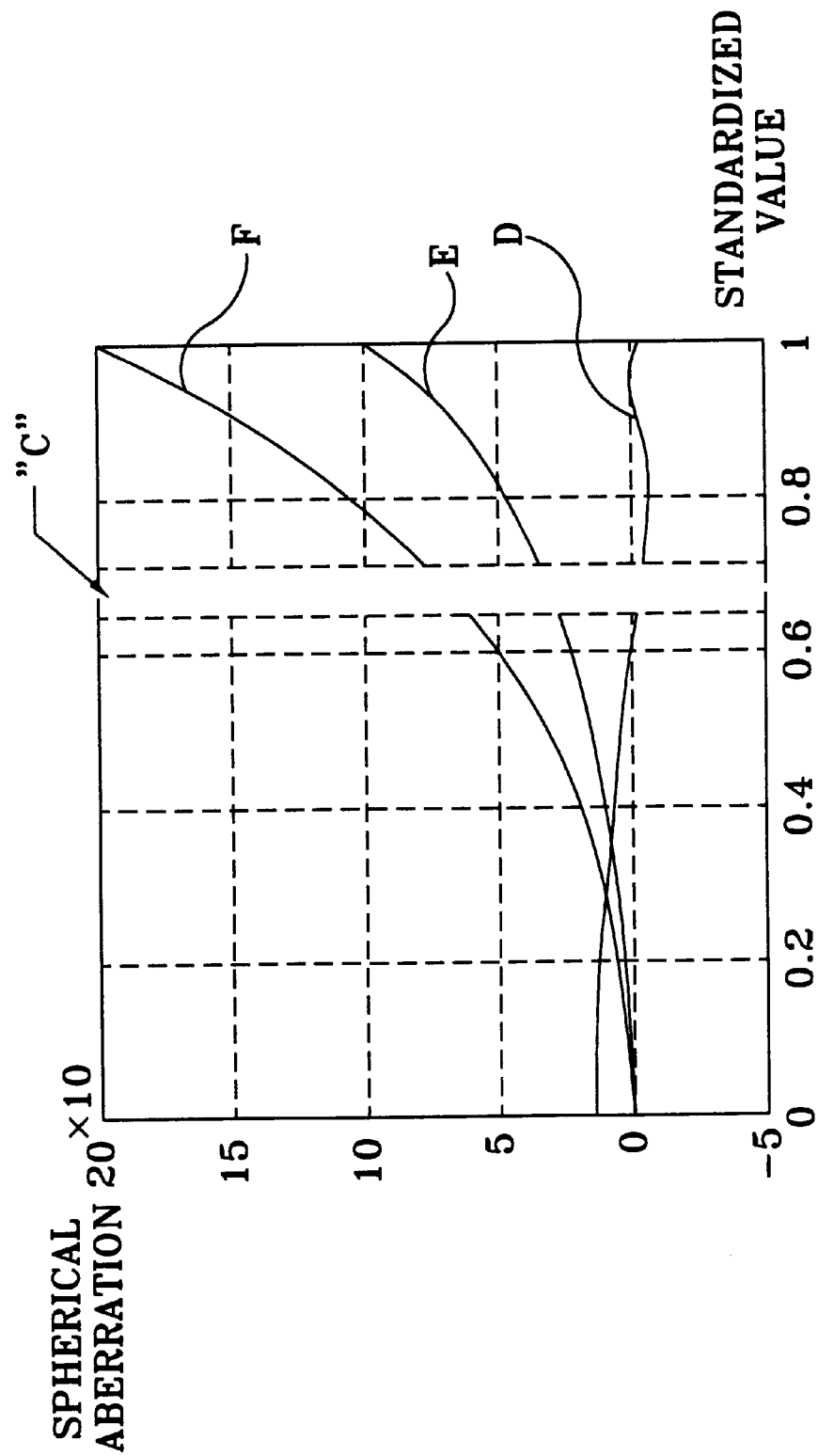
FIG. 4 is a graphical view showing a variation of spherical aberration when a laser unit shown in FIG. 3 is moved.

FIG. 4 is a graphical view showing the variation of spherical aberration when the laser unit 44 of FIG. 3 is moved, in which the vertical axis represents spherical aberration and the horizontal axis represents a value that an optical path beyond the center of the annular shielding objective lens 38 is standardized to the outermost radius of the objective lens 38. An annular shielding region of the annular shielding objective lens 38 is denoted by "C", which is in the range between 0.63~0.68 in the horizontal axis of FIG. 4. Here, when a region of 0.63 or below is defined as a near axis region and a region of 0.68 or above is denoted as a far axis region, the light beam in the far axis region is beyond the photodetector 41 due to a great amount of spherical aberration.

Here, "D" represents that the laser unit 44 is disposed at the position "A", and "E" and "F" represent that the laser unit 44 is respectively moved from the position "A" by 1.0 mm and 2.0 mm to thereby lengthen a total conjugate length (TCL).

Figure 5A:
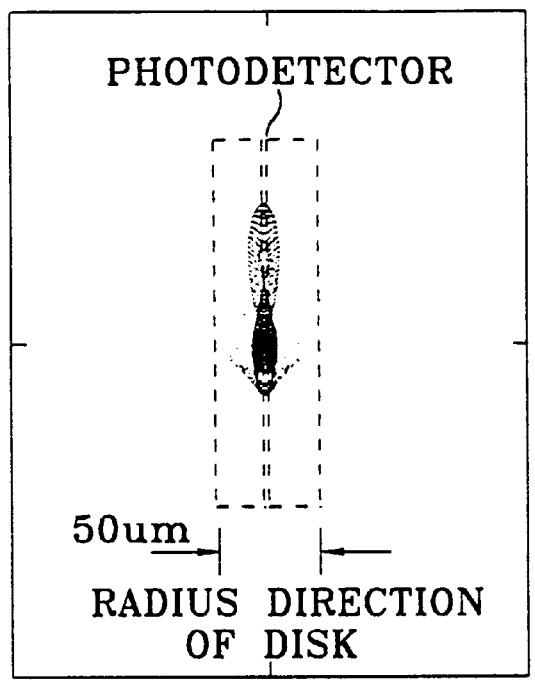
FIGS. 5A and 5B are views showing an optical detection state of a photodetector according to a position of the laser unit shown in FIG. 3.
Figure 5B:
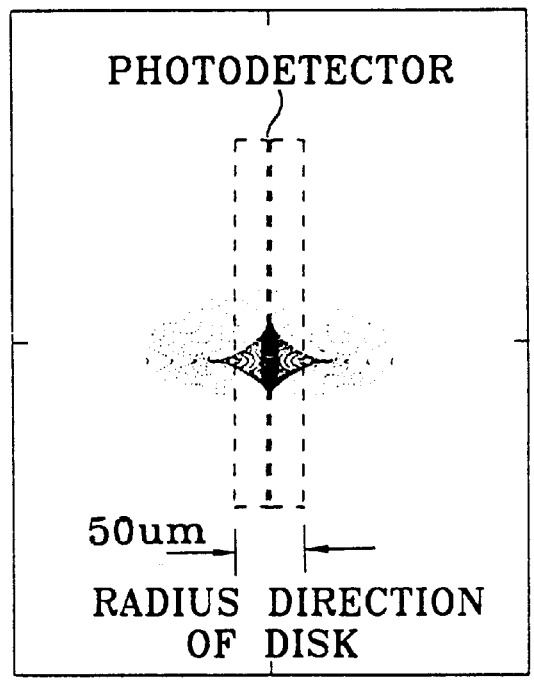

FIGS. 5A and 5B are views showing the optical detection state of the photodetector 41 according to the position of the laser unit 44. FIG. 5A represents that all light beams passing through the annular shielding objective lens 38 are detected by the photodetector 41 when the laser unit 44 is disposed at the position "A" as shown in FIG. 3. FIG. 5B represents that a great amount of spherical aberration is generated and the light beam passing through the far axis region of the annular shielding objective lens 38 is beyond the photodetector 41 when the laser unit 44 is disposed at the position "B" as shown in FIG. 3.

As described above, the optical pickup of the present invention has compatibility with respect to disks regardless of the thicknesses and various aspects of the disks, and can detect a good signal. Also, the optical pickup according to the present invention can be manufactured and mass-produced at a low cost.

While only a certain embodiment of the invention has been specifically described herein, it will be apparent that numerous modifications may be made thereto without departing from the spirit and scope of the invention.

What is claimed is:

1. An optical pickup compatible with first and second type of optical recording media using light beams having respectively different wavelengths for recording and/or reproducing information from the first and second type optical recording media, the optical pickup comprising:

a first laser light source to emit a light beam having a first wavelength;

a first photodetector to detect the light beam having the first wavelength reflected from the first type of optical recording medium;

an objective lens which forms an annular shielding region between a near axis region thereof of a first radius and a far axis region thereof of a second radius larger than the first radius;

a laser unit to emit a light beam having a second wavelength longer than the first wavelength to the objective lens, and to detect only a portion of the light beam having the second wavelength which passes though the near axis region of the objective lens and reflected from the second type optical recording medium; and a plurality of beam splitters to direct the light beams emitted from the first laser light source and the laser unit to the objective lens, and to direct the light beam reflected from each of the first and second type optical recording media to a respective one of the first photodetector and the laser unit, wherein the laser unit moves from a first position where there is no aberration to a second position further from the information recording surface of the second type optical recording medium to enlarge the beam spot size of the light beam light beam having the second wavelength on the second type optical recording medium.

2. The optical pickup according to claim 1, wherein said laser unit is a single module comprising:

a second laser light source which emits the light beam having the second wavelength; and a second photodetector which detects the reflected light beam reflected from the second type optical recording medium.

3. The optical pickup according to claim 2, wherein said second photodetector which detects the reflected light beam having the second wavelength has a size in a radial direction of the second type optical recording medium so that only the portion of the light beam having the second wavelength which passes through the near axis region of the objective lens is detected.

4. The optical pickup according to claim 1, wherein said plurality of beam splitters comprises:

a first beam splitter to totally transmit the light beam emitted from the first laser light source having the first wavelength to the objective lens and totally transmit the light beam having the first wavelength reflected from the first type optical recording medium to the first photodetector, and to totally reflect the light beam emitted from the laser unit having the second wavelength to the objective lens and totally reflect the light beam having the second wavelength reflected from the second type optical recording medium to the laser unit;

a polarizing beam splitter to totally reflect the light beam emitted from the first laser light source to the beam splitter, and to totally transmit the light beam reflected from the first type optical recording medium and transmitted through the beam splitter to the first photodetector; and a holographic beam splitter to totally transmit the light beam having the second wavelength emitted from the laser unit to the beam splitter, and to direct the light beam having the second wavelength reflected from the second type optical recording medium and totally reflected by the beam splitter to the laser unit.

5. The optical pickup according to claim 4, wherein the laser unit and the holographic beam splitter maintain a constant interval therebetween.

6. The optical pickup according to claim 4, further comprising:

a phase plate formed between the first beam splitter and the objective lens, to adjust a phase of the light beams emitted from the first laser light source and the laser unit and directed by the plurality of beam splitters; and a collimating lens formed between the phase plate and the objective lens, to collimate the phase adjusted light beams from the phase plate.

7. The optical pickup according to claim 6, further comprising an optical detection lens formed between the plurality of beam splitters and the first photodetector, to transmit the light beam reflected from the first type optical recording medium and directed by the plurality of beam splitters to the first photodetector.

8. The optical pickup according to claim 1, wherein the laser unit is located at a position where a length of an optical path from an information recording surfaces of the second type optical recording medium to the laser unit is longer than the length of the same optical path when no spherical aberration is generated.

9. The optical pickup according to claim 1, further comprising:

a phase plate formed between the plurality of beam splitters and the objective lens, to adjust a phase of the light beams emitted from the first laser light source and the laser unit and directed by the plurality of beam splitters; and a collimating lens formed between the phase plate and the objective lens, to collimate the phase adjusted light beams from the phase plate.

10. The optical pickup according to claim 9, further comprising an optical detection lens formed between the plurality of beam splitters and the first photodetector, to transmit the light beam reflected from the first type optical recording medium and directed by the plurality of beam splitters to the first photodetector.

11. An optical pickup of an optical player compatible with first and second type optical recording media different from each other, to record and/or reproduce information from recording surfaces of the first and second type optical recording media, the optical pickup comprising:

a first light source to emit a first light beam having a first wavelength in response to the first type optical recording medium being in a readable position of the optical player;

a first photodetector;

a light unit to emit a second light beam having a second wavelength longer than the first wavelength in response to the second type optical recording medium being in a readable position of the optical player;

an objective lens which has a near axis region closest to an optical axis thereof and a far axis region surrounding the near axis region, to direct the first and second light beams toward the respective first and second type optical recording media; and a beam splitting element to direct the first light beam from the first light source and the second light beam from the light unit to the objective lens, and to direct the first and second light beams reflected from the respective first and second optical recording media to the first photodetector and the light unit, respectively;

wherein the light unit detects only a portion of the second light beam reflected from the second type optical recording medium which passes through the near axis region of the objective lens, and the light unit moves from a first position where there is no aberration to a second position further from the information recording surface of the second type optical recording medium to enlarge a beam spot size of the second light beam on the second type optical recording medium.

12. The optical pickup according to claim 11, wherein the objective lens comprises an annular shield formed between the near and far axis regions, to prevent the first and second light beams from passing therethrough.

13. The optical pickup according to claim 11, wherein the objective lens comprises an annular shield formed between the near and far axis regions, to prevent the first and second light beams incident thereon from reaching the first photodetector and the light unit, respectively.

14. The optical pickup according to claim 11, wherein the first type optical recording medium is a digital versatile disk and the second type optical recording medium is a compact disk.

15. The optical pickup according to claim 11, wherein said beam splitting element comprises:

a first beam splitter to totally transmit the first light beam emitted from the first light source to the objective lens and totally transmit the first light beam reflected from the first type optical recording medium to the first photodetector, and to totally reflect the second light beam emitted from the light unit to the objective lens and totally reflect the second light beam reflected from the second type optical recording medium to the light unit;

a polarizing beam splitter to totally reflect the first light beam emitted from the first light source to the beam splitter, and to totally transmit the first light beam reflected from the first type optical recording medium and transmitted through the beam splitter to the first photodetector; and a holographic beam splitter to totally transmit the second light beam emitted from the light unit to the beam splitter, and to direct the second light beam reflected from the second type optical recording medium and totally reflected by the beam splitter to the light unit.

16. The optical pickup according to claim 11, wherein said light unit is a single module comprising:

a second light source which emits the second light beam; and a second photodetector which detects the second light beam reflected from the second type optical recording medium, wherein the second photodetector has a size in a radial direction of the second type optical recording medium so that only the portion of the second light beam which passes through the near axis region of the objective lens is detected.

17. The optical pickup according to claim 11, wherein: said light unit is a single module comprising a second light source which emits second light beam, and a second photodetector which detects the second light beam reflected from the second type optical recording medium, wherein the second photodetector has a size in a radial direction of the second type optical recording medium so that only the portion of the second light beam which passes through the near axis region of the objective lens is detected; and said beam splitting element comprises a first beam splitter to totally transmit the first light beam emitted from the first light source to the objective lens and totally transmit the first light beam reflected from the first type optical recording medium to the first photodetector, and to totally reflect the second light beam emitted from the light unit to the objective lens and totally reflect the second light beam reflected from the second type optical recording medium to the second photodetector;

a polarizing beam splitter to totally reflect the first light beam emitted from the first light source to the beam splitter, and to totally transmit the first light beam reflected from the first type optical recording medium and transmitted through the beam splitter to the first photodetector; and a holographic beam splitter to totally transmit the second light beam emitted from the light unit to the beam splitter, and to direct the second light beam reflected from the second type optical recording medium and totally reflected by the beam splitter to the second photodetector.

18. An optical pickup of an optical player compatible with first and second type optical recording media different from each other, to record and/or reproduce information from recording surfaces of the first and second type optical recording media, the optical pickup comprising:

a first light source to emit a first light beam having a first wavelength in response to the first type optical recording medium being in a readable position of the optical player;

a first photodetector;

a light unit to emit a second light beam having a second wavelength longer than the first wavelength in response to the second type optical recording medium being in a readable position of the optical player;

an objective lens to direct the first and second light beams toward the respective first and second type optical recording media; and a beam splitting element to direct the first light beam from the first light source and the second light beam from the light unit to the objective lens, and to direct the first and second light beams reflected from the respective first and second optical recording media to the first photodetector and the light unit, respectively;

wherein the light unit moves from a first position at which substantially no spherical aberration is generated to a second position at which the spherical aberration is generated, so that a total conjugate length of the second light beam from the information recording surface of the second type optical recording medium to the light unit is lengthened.

19. The optical pickup according to claim 18, wherein the first type optical recording medium is a digital versatile disk and the second type optical recording medium is a compact disk.

* * * * *